June 2, 1959 W. K. CAUGHEY 2,889,549

DIGITAL CONVERTERS

Filed Dec. 20, 1954

INVENTOR.
W. K. CAUGHEY

BY G. D. O'Brien
F. L. Stymer
ATTYS.

2,889,549

DIGITAL CONVERTERS

William Kastner Caughey, Madison, N.J., assignor, by mesne assignments, to the United States of America as represented by the Secretary of the Navy Application December 20, 1954, Serial No. 476,610

10 Claims. (Cl. 340—347)

This invention relates to digital-to-analog data converters and is particularly directed to means for reading step-by-step bits of digital data, such as perforated tape-type data, and translating the numerical information that is contained in the coded perforations into analogous voltages.

While such a converter may find innumberable applications, one specific application is mentioned for convenience of description. In fire control equipment, for example, the most practical way to test the equipment is to feed information concerning target position or motion into the equipment and observe the response of the equipment. Target position data, such as range, azimuth, elevation and bearing, and rates of change of position data are conveniently coded on tape, forward movement of the tape then becoming the time function of the variables. Now, in the case of some radar-acquired target information, the fire control equipment receives small incremental changes in target data, so, to simulate the output of the radar, step functions of the variables are appropriate.

The object of this invention is improved means for converting digital data, of the type found on perforated tape, to analogous voltages.

In converting digital information of a variable as a function of time, it is convenient to convert only changes in the variable for evenly measured intervals of time, as distinguished from converting the absolute value of the variable of time. According to this invention the converter of this information comprises a storage condenser and a plurality of incremental condensers of different capacities, the different capacities being so chosen that various combinations of the condensers in parallel will yield capacities of various values in small steps. Switches connect each of the incremental condensers to a charging source and then, in response to the tape perforations, selectively connect the incremental condensers to a discharge circuit including said storage condenser. The resultant change in voltage across the storage condenser is proportional to the algebraic sum of the incremental charges transferred thereinto. Means are provided for preventing deterioration of this resultant charge.

Figure 2:
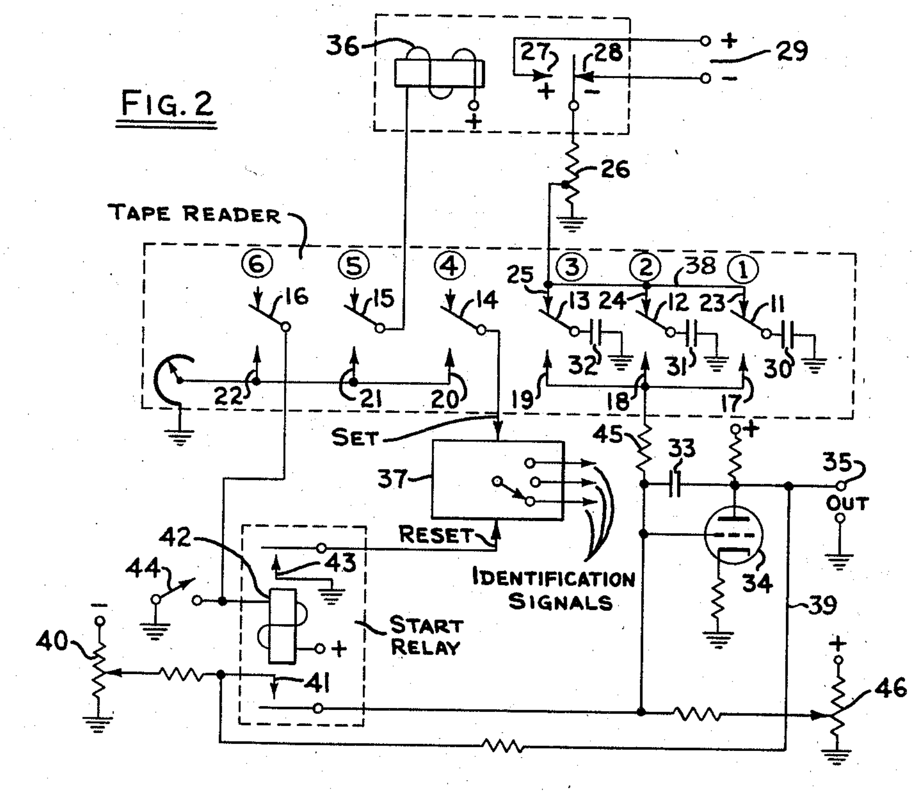
Figures 1, 3:
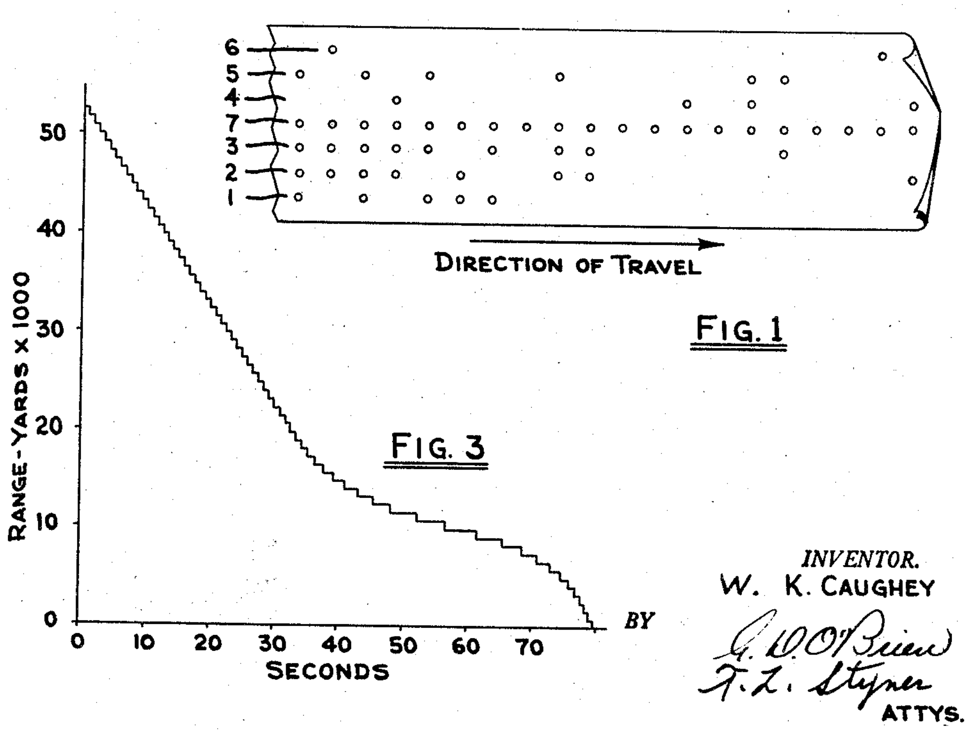

The objects and features of this invention will become apparent in the specific circuit described in the following specification, defined in the appended claims, and shown in the accompanying drawing in which:

Figure 1 is a segment of a perforated tape of the type employed in the circuits of Figure 2, Figure 2 is a schematic wiring diagram of one digital-to-analog data converter of this invention, and Figure 3 is a graph of one variable converted by the circuits of Figure 2.

The tape of Figure 1 is of the type in which a plurality of channels or rows 1, 2, 3, 4, 5, and 6 of evenly spaced perforations may be made. The tape is of insulating material and the perforations are of such a size and shape that feeler contacts may reach therethrough, contact metal terminals over which the tape is drawn, and hence electrically sense the presence of the perforation in accordance with usual "Teletype" practice. Another longitudinal row 7 of perforations engages a sprocket wheel for precisely indexing the tape for each time interval, so that each transverse row of perforations are always known to the machine. In the particular tape of Figure 1, the bottom three longitudinal rows of perforations are intended to contain the intelligence or numerical information, while the 4th, 5th and 6th rows are intended to contain information ancillary to the numerical information such as identification signals, polarity signals, and start and stop signals. It is to be remembered that the tape speed is quite high, that read-out may be, say, five readings per second, and that the circuitry into which the numerical information is fed must be instructed by this ancillary information.

The six feelers 11, 12, 13, 14, 15 and 16, Figure 2, move up to the tape each time the tape is indexed forward to touch either the tape or the contacts 17—22 underlying the perforations. The feeler comprises the blade of a single-pole double-throw switch. The back contacts 23, 24 and 25 of the number channels 1, 2, and 3 are connected in parallel by conductor 38, and through the slider of an adjustable potentiometer 26 to either the positive or negative terminal 27, 28 of the voltage source 29. To each armature or feeler 11, 12, and 13 is connected an incremental condenser 30, 31 and 32, the condensers being of different sizes, respectively, such as .01, .02, and .04 microfarad. The opposite terminal of each condenser is grounded. When selected ones of the condenser plates are coupled to contacts 17, 18 and/or 19, through tape perforations, the charge in each condenser is transferred to the storage condenser 33. By coupling the storage condenser between the output and input of the direct current amplifier 34, as shown, loss of charge from the storage condenser will be negligible between readings or during runs of several minutes, as hereinafter pointed out. The voltage at the anode terminal of the storage condenser is available at the output post 35.

The blade 15 of channel 5 is connected to the winding 36 of a polarity relay, the armature of which will ride against either the positive or negative terminal of the voltage source 29. Hence, in operation the presence or absence of a perforation in channel 5 determines whether condensers .01, .02 and .04 are charged positively or negatively and hence determine for the following time interval whether the storage condenser will be increased or decreased in charge. With this combination of condensers, capacity values from .01 to .07 microfarad may be obtained, in increments of .01 microfarad.

Blade 14 of channel 4 may be employed to identify the information contained in the perforations for each time interval. For example, a signal on blade 14 may indicate that the informational content of the perforations in the next succeeding block of perforations pertain, say, to target range or to target bearing. The blade 14 may be employed to set a stepping relay, not shown but contained in box 37, the output of which may be employed to route the storage condenser output, via telephone-type switches, to selected utilization circuits or to signal lamps to inform the operator of the identity of the current tape signals.

Where the storage condenser receives incremental changes in the variable as distinguished from absolute values for each time interval, it is important that the storage condenser commence the "run" by having an initial accurately predetermined charge analogous to the initial value of the variable. To apply this initial charge, the voltage is manually selected on the potentiometer 40 and is connected to the condenser through the make contact 41 of the starting relay. This contact is closed by the relay winding 42 connected to the blade 16 of channel 6. During the starting phase of each "run," when storage condenser 33 is being charged to an initial potential, the negative feedback path 39 from the plate of tube 34 through relay 41 to the grid of tube 34 prevents condenser 33 from charging beyond the magnitude of the potential established by the setting of potentiometer 40. Furthermore, conductor 39 and the resistor contained therein operate as a leg of the voltage divider between the source of negative potential applied to potentiometer 40 and the source of positive potential applied to the plate of tube 34. As a result, the grid of tube 34 can be subjected to an initial bias of positive or negative polarity, as desired.

Push button 44 parallels the blade 16 circuit. A second make contact 43 associated with the winding may be connected to the identification box to reset the relays (not shown) of the identification circuits. Starting relay 42 is slow to release so that condenser 33 will have ample time to fully charge to the potential manually set on potentiometer 40. If desired, the release time may be extended by a series of adjacent tape perforations in channel 6.

Referring now to the storage condenser and its incremental charging circuit, the storage condenser is connected between the anode and grid of the amplifier 34. The grid is coupled to the input circuit through a resistance 45 of fairly low ohmic value proportioned to limit the initial charging current of condenser 33 to a value which will not overload amplifier 34, thus avoiding a flow of grid current which would reduce the charge on condenser 33. When the charged incremental condensers are connected, the grid immediately drives in a positive or negative direction depending upon the polarity of the charged condensers. The immediate change in the space current of the amplifier drives the opposite terminal of the storage condenser in the opposite direction. With theoretically infinite gain, the grid voltage can be reduced to zero. It follows that the charges of the incremental condensers may be transferred to the storage condenser without loss of the resultant charge on the storage condenser. For all practical purposes the charge transferred is equal to the sum of the charges on one or more of the three incremental condensers. Assume, for example, that positively-charged incremental condensers 31 and 32 are connected to the grid circuit of amplifier 34. The positive potential on the grid will increase the flow of plate current, thereby decreasing the positive plate potential and the positive charge on the plate side of storage condenser 33. As a result, the grid side of storage condenser 33 will become more positive because electrons will be displaced therefrom. Accordingly, the negative charging of the plate side of storage condenser 33 will continue until a sufficient number of electrons have been displaced from the grid side to neutralize the positive potential from incremental condensers 31 and 32. It should be apparent, therefore, that the amount of charging to which storage condenser 33 will be subjected will depend upon the quantity of positive or negative capacitive charge established by one or more of the incremental condensers 30, 31, and 32 which, at any time, may be connected in parallel to the grid circuit of amplifier 34. Even though the utilization circuit connected to the anode terminal of the amplifier may have finite impedance, the charge on the storage condenser faithfully follows the dictates of the incremental condensers. Furthermore, by making the dwell time of the blades 11, 12 and 13 on make contacts 17, 18 and 19 several times the time constant of the transfer circuit, the storage condenser can stabilize after each change of voltage, and the effects of transients and contact chatter are eliminated.

The success of the converter of this invention obviously depends upon the reliability with which the incremental charges of the small condensers can be algebraically added in the storage condenser. This success, then, depends on the gain of the amplifier and the freedom of the storage condenser from the effects of condenser leakage. Leakage currents across the charged storage condenser 33, or the incremental condensers 30, 31, 32 will tend to cause a drift with time of the output voltage at terminal 35, in accordance with the fundamental condenser equation $$I=C\frac{de}{dt}$$

where I is the leakage current, C the capacity of the condenser, and $$\frac{de}{dt}$$

the drift in voltage. If the dielectric of these condensers is made of "mylar" or polystyrene, this drift effect is negligible. The output voltage at terminal 35 may also drift with time due to leakage current from the grid electrode of tube 34. By proper selection of this tube, this grid current may be reduced to $1\times10^{-9}$ ampere, or less, and may be balanced out by introducing into the grid circuit an equal bucking current from an external source, such as the potentiometer 46.

Figure 3 shows the actual step variations of one variable with respect to time. This particular variable shows range changing from about 50,000 yards to zero yards during the time period from zero seconds to 80 seconds. The charge on the storage condenser decreased from a maximum to zero, the size of the steps remaining substantially constant until about 45 seconds whereupon a pronounced deceleration took place, and at about 60 seconds the initial velocity was resumed. Similar plots were made for azimuth, elevation and bearing.

Many modifications may be made in the digital to analog converters of this invention without departing from the scope of the appended claims.

I claim:

1. In combination, a plurality of single-pole double-throw switches, each of said switches having two fixed terminals and a blade; a source of direct current potential including positive and negative terminals connected to one fixed terminal of each switch; a plurality of incremental condensers of different capacities connected, respectively, to the blades of the switches; a storage condenser with one terminal connected to the other fixed terminals of the switches, means for selectively operating the blades in response to digital coded intelligence; and a grid controlled electron discharge device with the grid and anode connected, respectively, to opposite sides of said storage condenser, the gain of the discharge device being sufficiently high to hold said one terminal of the storage condenser at a substantially constant potential as the incremental condensers are discharged into the storage condenser.

2. The combination defined in claim 2, further comprising means responsive to each digit of coded intelligence for selectively connecting the first mentioned fixed terminals of said switches to either the positive or negative terminal of said direct current source.

3. The combination defined in claim 2, further comprising means for manually setting the initial charge in said storage condenser at a desired predetermined level.

4. In combination in a system for reading information on a tape having two groups of rows of digital information, one group containing numerical information and the other group containing identification signals, start signals, and polarity determining signals ancillary to the numerical information; said system comprising a plurality of single-pole double-throw switches responsive to the digital numerical information in said one group of rows, each of the said switches having two fixed terminals and a blade; a plurality of incremental condensers of different capacities connected, respectively, between the blades of the switches and a reference ground; a charging source; a storage condenser; means coupling one terminal of the storage condenser in parallel to one each of the terminals of said switches; means including a reversing switch coupling the other terminals of the said switches together and to said charging source; means responsive to said polarity signal for actuating the said reversing switch to reverse the polarity of the charging source; and means for establishing an initial charge in said storage condenser comprising an adjustable voltage source and a relay responsive to said start signals for connecting the voltage source to the storage condenser.

5. Apparatus for generating electrical potentials representative of digitalized numerical intelligence comprising: a source of digital intelligence; a source of direct-current potential; a plurality of elements having successively larger capacities for receiving and storing at least a portion of an electrical potential provided by the said direct-current potential source; an electrical-potential storage element having two terminals; an output circuit coupled electrically to one terminal of the said storage element; and means responsive to the said source of digital intelligence for selectively connecting the said plurality of elements first to the said source of direct-current potential and next to the other terminal of the said electrical-potential storage element such that the electrical potential stored in the last-named element will represent continuously the cumulative algebraic sum of the said digitalized numerical intelligence.

6. Generating apparatus as represented in claim 5 wherein the said elements for receiving and storing an electrical potential and the said electrical-potential storage element comprise condensers.

7. Generating apparatus as represented in claim 5 wherein the said output circuit comprises: an amplifier having at least an input element for a signal to be amplified and an output element, and means coupling the said digital-intelligence responsive means to the said input element and the said other terminal of the said electrical-potential storage element; and means coupling the said output element to the said one terminal of the said electrical-potential storage element.

8. Generating apparatus as represented in claim 5 wherein the said digital-intelligence responsive means comprises: a plurality of single-pole double-throw switches, each of said switches having two fixed terminals and a third terminal electrically coupled to a switch blade; means electrically coupling the said third terminal of each of the said switches to one only of the said plurality of elements for receiving and storing electrical potentials; means electrically coupling a fixed terminal of each of the said switches to the said source of direct-current potential; and means coupling the other one of the said fixed terminals to the said other terminal of the electrical-potential storage element.

9. Generating apparatus as represented in claim 5 wherein the said source of digital intelligence comprises a tape punched with holes having positions on the tape representative of the time and magnitude of each unit of digital intelligence.

10. Generating apparatus as represented in claim 5 wherein the said source of direct-current potential includes positive and negative polarity output terminals.

References Cited in the file of this patent

UNITED STATES PATENTS 2,656,497 Schweighofer et al. ------ Oct. 20, 1953